Oct. 9, 1962 R. K. BRUNNER 3,057,970

ARRANGEMENT FOR SETTING THE RECORDING HEADS
OF MAGNETIC RECORDING MACHINES

Filed Aug. 25, 1959 3 Sheets-Sheet 1

INVENTOR
Russell K. Brunner

BY

INVENTOR
Russell K. Brunner

BY

Oct. 9, 1962 R. K. BRUNNER 3,057,970

ARRANGEMENT FOR SETTING THE RECORDING HEADS OF MAGNETIC RECORDING MACHINES

Filed Aug. 25, 1959 3 Sheets-Sheet 3

INVENTOR

Russell K. Brunner

BY

K. Atanchun

United States Patent Office 3,057,970

Patented Oct. 9, 1962

3,057,970

ARRANGEMENT FOR SETTING THE RECORDING HEADS OF MAGNETIC RECORDING MACHINES

Russell K. Brunner, San Jose, Calif., assignor to International Business Machines Corporation, New York, N.Y., a corporation of New York Filed Aug. 25, 1959, Ser. No. 835,995
6 Claims. (Cl. 179—100.2)

The present invention relates to magnetic recording machines of the type comprising a number of adjacently positioned recording disks mounted for rotation about a common axis, and means for magnetically recording information on, or retrieving previously recorded information from, said disks including a number of recording heads which are located adjacent the recording surfaces of the disks and hold magnetic transducers in operative position relative to said surfaces.

During practical performance of machines of the type here under consideration, the recording disks are turned about their common axis while the recording heads are usually held in a stationary position relative to the rotating disks, except when it is necessary to move them to new recording tracks radially of the disks. For properly recording information on a rotating disk, or for retrieving previously recorded information in an intelligible manner from said disk, it is necessary that a transducer be held very closely to the adjacent surface of the disk with which it cooperates magnetically, but remain at all times slightly spaced from said surface because direct contact of the transducer with the disk might damage both the disk and the transducer.

In practice recording heads are usually mounted in such a manner that they may be shifted from an idle position wherein they are safely withdrawn from the recording disks to an operating position wherein they lie very closely to their coacting recording surfaces, and wherein they may even be urged with a gentle force against these surfaces to assure that they will at all times during the performance of the machine remain sufficiently close to the recording surfaces to provide satisfactory recordings or permit clearly understandable recovery of previously recorded information. In the latter position the machine may rely entirely on the thin layer of air that adheres to and rotates with the surfaces of the rotating disks for preventing direct contact of the recording heads with the recording disks. However, when the rotational speed of the recording disks decreases, as it may for a variety of different reasons, below a critical value which depends on the weight of the recording head and on the force with which the recording head is urged against its coacting recording surface, these rotating layers of air may no longer be adequate to separate the recording heads from the recording disks, and the heads and the disks may contact each other and come to harm or obliterate information previously recorded upon the disks.

Generally, it is an object of my invention to provide means for safeguarding both the recording disks and the recording heads of magnetic recording machines against damage that may result from direct contact of one with the other when the disks are in the process of rotation.

It is another object of my invention to provide a mounting arrangement for the recording heads, of machines of the type here under consideration, which holds the recording heads during performance of the machine in their proper position closely adjacent to, yet slightly spaced from, their coacting recording surfaces without the danger that the recording heads and their coacting recording surfaces may come into contact with each other if the rotational velocity of the recording disk should decrease during performance of the machine.

Another object of my invention is to provide a mounting arrangement for the recording heads of machines of the type here under consideration, which may be set from an idle position wherein the recording heads are safely withdrawn from their coacting recording surfaces to an operative position wherein they lie closely adjacent to said surfaces, and which is operable only if the recording disks are in a state of rotation and their rotating speed has reached a value at which the layers of air on the surfaces of said disks can be depended upon to keep the recording heads and the recording surfaces out of direct contact with each other.

Still another object of my invention is to provide a loading arrangement for recording heads that may be set to an operative position wherein the recording heads are urged toward the coacting surfaces of the recording disks, provided said disks are in the process of rotation and rotate at an adequate speed, and which will automatically release its pressure upon the recording heads permitting them to withdraw from their coacting recording surfaces to a safe distance as soon as the rotational speed of the recording disks drops below a safety limit.

Furthermore, it is an object of my invention to provide a crank mechanism that may be manipulated to apply a desired load to recording heads of magnetic recording machines, but does not respond to manipulation until the rotational speed of the recording disks reaches a predetermined level.

Still another object of my invention is to provide a crank mechanism that may be manipulated to apply a desired load to the recording heads of recording machines and, when so manipulated, may be latched in effective position, and yet will instantaneously become ineffective and release the load applied to the recording heads whenever the rotational speed of the recording disks drops below a predetermined level without need to first release the latch.

Yet another object of my invention is to provide a device of the type referred to that is of simple construction, easy to manipulate and dependable in operation.

These and other objects of my invention will be apparent from the following description of the accompanying drawings which illustrate a preferred embodiment thereof and wherein—

Figure 1:
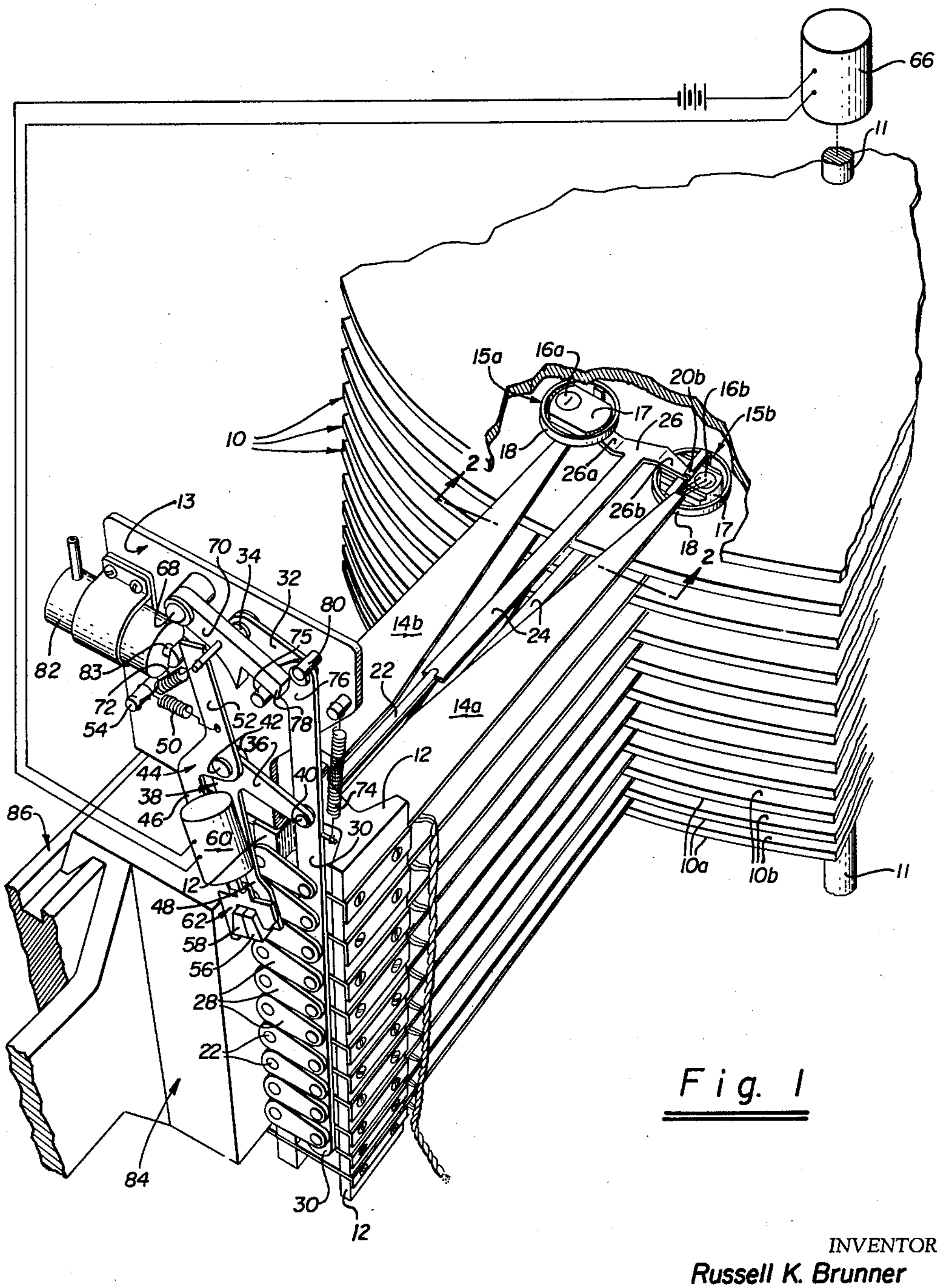
FIGURE 1 is a fragmentary perspective of a recording machine embodying my invention, illustrating recording disks, the recording heads associated with said disks, and the manner in which said recording heads are mounted.
Figures 2, 3, 4:
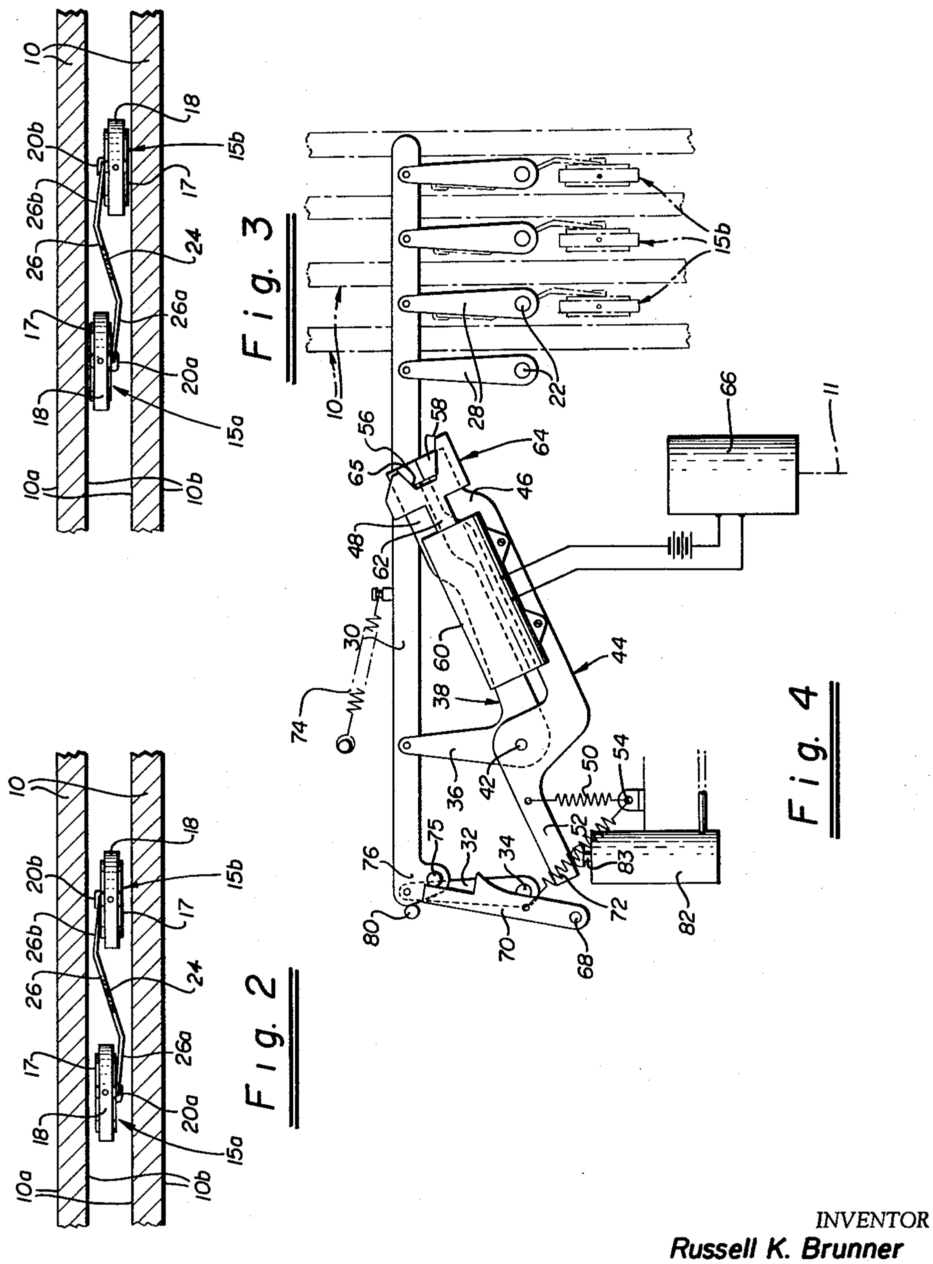
FIGURE 2 is a vertical section viewed along plane 2—2 of FIGURE 1 illustrating a pair of recording heads in idle position relative to their coacting recording surfaces.
FIGURE 3 is a vertical section similar to FIGURE 2 illustrating the recording heads in operative position closely adjacent to their coacting recording surfaces.
FIGURE 4 is an elevation of part of the structure for controlling the position of the recording heads.

Having first reference to FIGURE 1, the reference numeral 10 identifies a plurality of adjacently positioned circular disks that are mounted for rotation in unison upon a common, vertically disposed shaft 11 and which are spaced equal distances apart from each other in the direction axially of said shaft. The disks 10 may be made of a magnetizable material, or each of their surfaces **10*a* and 10*b* may be provided with a thin layer of magnetizable material (not shown). Suitably mounted in a block 12 located exteriorly of the disks are superposed pairs of arms 14*a* and 14*b* that extend into the space between each two adjacent disks 10, and supported from the ends of said arms are recording heads 15***a* and 15*b*, respectively, within which transducers 16*a* and 16*b* are mounted. The transducers 16*a* and 16*b* are held in the recording heads 15*a* and 15*b*, respectively, in such a manner that they may turn freely about two axes that are disposed at right angles to each other and which are contained in a plane substantially parallel to the surfaces of the adjacent disks so that during rotation of the disks the transducers may readily assume their proper positions relative to the magnetic surfaces with which they cooperate, irrespective of any irregularities in said surfaces. For this purpose each transducer may be mounted in a shoe 17 that is pivotally supported for rotation about a vertical axis in a ring 18, which in turn is pivotally supported for rotation about a horizontal axis extending radially of the disks from a bracket 20*a* or 20*b*, respectively, provided at the end of each arm 14*a* and 14*b*, as illustrated and described in copending U.S. patent application Serial No. 737,583 of A. G. Osterlund, filed on May 26, 1958. When not in operation, the recording heads 15*a* and 15*b* are held in a position withdrawn from their coacting recording surfaces 10 and 10*b* at a distance that makes accidental contact of the recording heads with the adjacent disks impossible, as illustrated in FIGURE 2. In practice an interval of 0.1 inch between the recording surfaces 10*a* and 10*b* and their coacting recording heads 15*a* and 15*b*, respectively, is sufficient to preclude contact of one with the other. For performing a recording operation, however, or for retrieving previously recorded information, the transducers should be approached to their adjacent disks to a position wherein they are spaced from their coacting recording surfaces by a much smaller distance (FIGURE 3), which may be of the order of only .0004 inch.

To effect the necessary approach of the two transducers interposed between each two adjacent disks to their coacting recording surfaces 10*a* and 10*b*, respectively, a shaft 22 is rotatably mounted in the block 12 between the arms 14*a* and 14*b* of each pair of arms and carries a flat bar 24 of resilient material, such as steel, that protrudes into the space between the recording heads 15*a* and 15*b*. At its end said bar 24 is provided with a cross bar 26 whose opposite arms 26*a* and 26*b* engage the brackets 20*a* and 20*b*, respectively, at the ends of the arms 14*a* and 14*b*. By applying a clockwise torque of appropriate strength to the shaft 22 while the disks 10 are in the process of rotation, both the recording heads 15*a* and 15*b* may simultaneously be approached to the coacting surfaces of the magnetic discs into such proximity as will insure proper cooperation between the transducers and the adjacent recording surfaces of the disks, as likewise described in the aforementioned U.S. patent application Serial No. 737,583.

When in operation, the described recording machine relies for prevention of contact of the recording heads with the adjacent surfaces of the recording disks solely upon the extremely thin layer of air that adheres to and rotates with the rotating surfaces of the disks. As pointed out hereinbefore, this layer of air is capable of effectively keeping the recording heads and the recording disks out of contact with each other only as long as the disks rotate with an adequate speed. In accordance with my invention, I therefore provide means that may be manipulated to apply to all the shafts 22 comprised in the machine the torque required for proper approach of the recording heads to their coacting recording surfaces, but which is effective only as long as the disks rotate at an adequate speed and which becomes ineffective and releases this torque automatically, permitting the recording heads to withdraw to a safe distance from the recording surfaces whenever the rotational speed of the disks drops to a predetermined minimum value below which the layer of air adhering to the surfaces of the disks can no longer be depended on to safeguard the recording surfaces and the recording heads from damage by direst contact with each other. As pointed out before, the critical speed limit at which this layer of air is capable of effectively keeping the recording heads separated from their coacting recording surfaces varies depending upon the weight of the recording heads and the force with which the recording heads are urged toward their cooperating recording surfaces. In an exemplary embodiment of the invention constructed as illustrated in the accompanying drawings, a rotational speed of 1600 revolutions per minute provided a dependable safety limit at and beyond which the layers of air adhering to the surfaces of the rotating disks would safely keep the recording heads apart from their cooperating recording surfaces.

Having reference to FIGURES 1 and 4, the protruding ends of the shafts 22 comprised in the machine carry firmly secured thereto upwardly directed parallel crank arms 28, and all the crank arms 28 comprised in the recording machine are pivotally connected to a transverse actuating bar 30 for movement in unison. The left end of said bar 30 is pivotally connected to the upper end of a supporting arm 32 that is pivoted at 34 to a plate 13. By moving the bar 30 an appropriate distance to the right, as viewed in FIGURE 4, to the position illustrated in FIGURE 5, the proper torque is applied to all the shafts 22 so that all the recording heads 15*a* and 15*b* are simultaneously placed into their proper operating positions closely adjacent to their cooperating recording surfaces (FIGURE 3).

In accordance with the invention I provide a normally disabled crank mechanism for pushing the actuating bar 30 into its torque imparting position. This crank mechanism cannot be effectively manipulated until the rotational speed of the recording disks 10 reaches a predetermined level. At said level the crank mechanism is rendered effective, and it remains in effective position whether it is actuated or not, as long as the rotational speed of the recording disks remains at or above said level; and I provide a latching means that holds the crank mechanism in its torque-exerting position once it has been actuated to apply the proper torque to the crank arms 28. However, when the rotational speed of the recording disks drops below the critical level, the crank mechanism of the invention is arranged to collapse, permitting the bar 30 and the crank arms 28 to return to their idle positions and withdraw the recording heads 15*a* and 15*b* from their coacting recording surfaces (FIGURE 2) irrespective of the position of the latching means; and I provide means actuated by the return movement of the bar 30 upon collapse of the crank mechanism, which returns the aforementioned latching means to its ineffective position so that the components of the crank mechanism may all assume their initial position.

Figure 5:
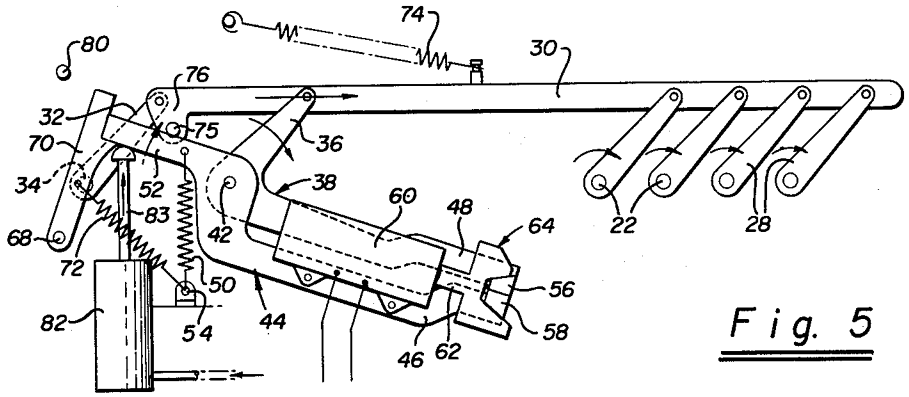
FIGURES 5, 6 and 7 are elevations of the control structure shown in FIGURE 4 illustrating different operational positions thereof.

Having reference to FIGURES 1 and 4, one arm 36 of a bell crank 38 is pivotally connected to an intermediate point 40 of the torque transmitting bar 30, and the bell crank in turn is pivotally connected to the plate 13 by a pivot stud 42. Clockwise movement of the bell crank 38 about its pivot stud 42 is effective to push the bar 30 into its torque-applying position (FIGURE 5). To apply clockwise rotation to the bell crank 38, a two-armed lever 44 is rotatably mounted upon the pivot stud 42 in a position adjacent to the bell crank 38, with its right arm 46 held adjacent the lower edge of the right arm 48 of the bell crank 38 by a spring 50 which is tensioned between the tail-shaped left arm 52 of said lever and a stud 54 projecting from the plate 13. Provided at the adjacent ends of bell crank arm 48 and lever arm 46 are laterally projecting studs 56 and 58, respectively. Firmly secured to the lever arm 46 is a solenoid 60 that has a normally retracted armature 62 which protrudes at the end of said solenoid facing the studs 56 and 58 and which is provided with a bifurcated head 64 that forms a recess 65 having converging side walls. The power circuit of the solenoid 62 includes a centrifugal switch represented by the block 66, which may be of the governor type and which is operatively connected to one end of the drive shaft 11 of the recording disks or to one of said disks, as indicated diagrammatically in FIGURE 1. Said switch is normally open but it closes under centrifugal force as soon as the rotational speed of the shaft 11 reaches a predetermined level. This limit is chosen to represent a speed at which the layer of air adhering to the rotating disks 10 is capable of keeping the loaded recording heads safely apart from the coacting surfaces of the recording disks. When the switch 66 closes, the solenoid 60 is energized and projects its armature 62 into a position wherein its bifurcated head 64 embraces the studs 56 and 58 that project laterally from the bell crank arm 48 and the lever arm 46, respectively, and in this manner holds said arms together.

Before energization of the solenoid 60, any movement imparted to the lever 44 remained without effect upon the bell crank 38 and hence without effect upon the position of the torque transmitting bar 30. Upon energization of the solenoid 60, however, an upwardly directed force applied to the tail 52 of the lever 44 is effective to swing both the lever 44 and the bell crank 38 in unison in a clockwise direction from the position shown in FIGURE 4 to the position shown in FIGURE 5, pushing the bar 30 to the right into a position wherein it applies the proper torque to all the torque shafts 22 comprised in the machine.

Pivoted to the plate 13 at a point 68 adjacent to the pivotal support 34 of arm 32 is a latch member 70, and when the tail 52 of lever 44 has reached an elevation whereat the proper torque is applied by the bar 30 to the torque shafts 22, said latch member drops underneath the tail of lever 52 under the urgency of a spring 72 which is tensioned between said latch member and the stud 54 on plate 13. Thus, the described crank mechanism is locked in its torque exerting position so that the recording heads 15*a*, 15*b* will remain in their operating positions closely adjacent to their coacting recording surfaces as long as the solenoid 60 remains in energized condition, i.e., as long as the rotational speed of the recording disks is such that the centrifugal switch 66 in the power circuit of the solenoid 60 remains closed.

Figure 6:
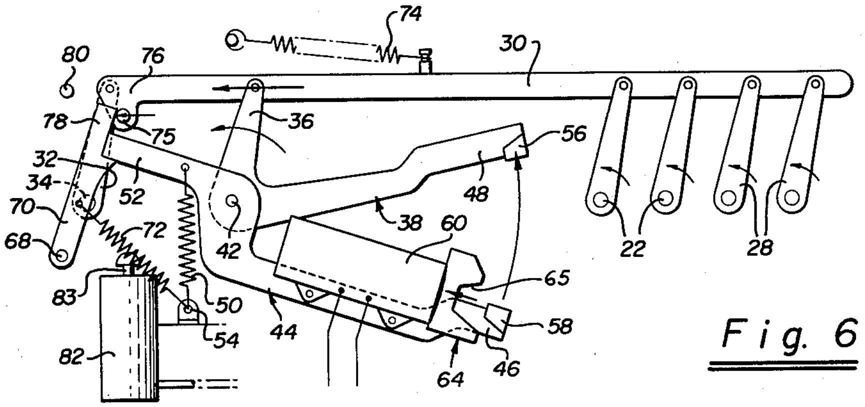

However, when the rotational speed of the recording disks drops below a value at which the layers of air adhering to the rotating disks can no longer be depended upon to prevent contact of the recording heads with the recording surfaces, the switch 66 opens causing deenergization of the solenoid 60. As a result the armature 62 is retracted and the forked head 64 thereof releases the studs 56 and 58 (FIGURE 6). With the bell crank 38 and the lever arm 44 thus no longer coupled for rotation in unison, the latch member 70 underneath the tail of lever 44 is no longer capable of holding the bell crank 38 in its torque-exerting position, and the bar 30 returns under the urgency of a suitable spring 74 to its position of rest, causing the torque shafts 22 to withdraw the recording heads comprised in the machine to a safe distance removed from their coacting recording surfaces.

Figure 7:
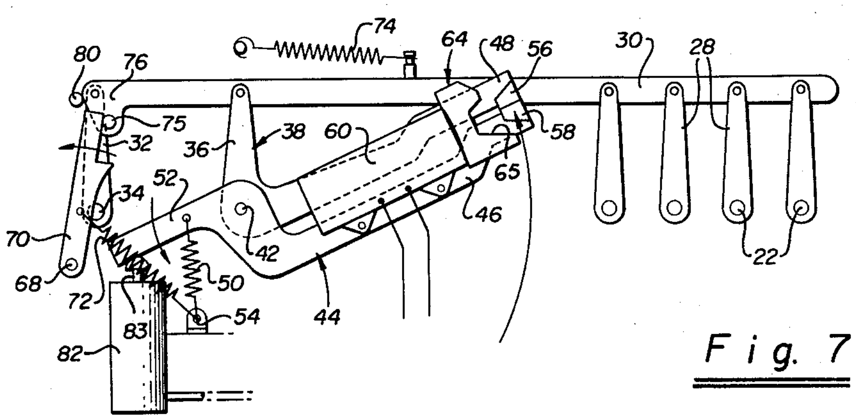

As the bar 30 returns to its initial position in the manner described, a stud 75 projecting laterally from a lug 76 formed at the left end of said bar strikes against the head 78 of the latch member 70 (FIGURE 6) and kicks it out from underneath the tail 52, permitting the lever 44 to turn in a counter-clockwise direction about the pivot stud 42 under the urgency of spring 50 until the end of its right arm 46 strikes against the stud 56 at the end of the right arm 48 of bell crank 38. Thus, the lever 44 resumes its initial position wherein its right arm 46 lies underneath and closely adjacent to the right arm 48 of the bell crank 38 and the studs 56 and 58 projecting from the ends of said arms lie closely adjacent to each other and in the path of the forked head 64 of the armature 62 (FIGURE 7). Hence, whenever the rotational speed of the recording disks reaches again the aforementioned critical limit and effects energization of the solenoid 60, the resultant projection of its armature 62 will again couple the bell crank 38 and the lever 44 for rotation in unison and in this manner condition the described crank mechanism of the torque transmitting bar for effective operation in response to an upwardly directed force applied to the tail 52 of lever 44 (FIGURE 4). To prevent excessive leftward movement of the bar 30 upon collapse of the crank mechanism 38—44, a limit stop in the form of a stud 80 mounted in the plate 13 may be provided adjacent to the left end of the torque transmitting bar 30 in its position of rest.

The force necessary to raise the tail 52 of lever 44 and in this manner load the recording heads 15*a* and 15*b* may be applied by hand or by the plunger 83 of a suitably mounted hydraulic cylinder diagrammatically indicated at 82, which is arranged to become ineffective and permit the plunger to drop to its position of rest in a manner well known in the art as soon as it raises the tail 52 of the lever 44 to the level wherein the latch 70 drops into latching position underneath said tail under the urgency of spring 72.

It remains to point out that the block 12, to which the ends of the recording-head-supporting arms 14*a* and 14*b* are secured and in which the torque shafts 22 are rotatably supported, and the mounting plate 13 form part of a carriage 84 which is mounted for sliding movement in a direction radially of the disks 10 upon a suitable base 86. Thus, by moving the carriage 84 closer to or farther away from the disks 10, the recording heads on the ends of the arms 14*a* and 14*b* may be set to different positions radially of the disks for cooperation with different tracks of said disks.

The arrangement for loading the recording heads in a magnetic recording machine of the type described, so as to place the transducers into operative position closely adjacent to their coacting recording devices, is of a simple construction. It cannot be operated effectively unless the speed of the recording disks exceeds a predetermined safety level. However, once the speed of the disks rises above a predetermined safety level, the arrangement of the invention may readily be placed into effective position wherein it applies the proper pressure to the recording heads; and when in effective position, the arrangement will immediately release the pressure applied to the recording heads and permit said recording heads to withdraw from the recording surfaces whenever the rotational speed of the recording disks drops below said safety level and the thin layers of air adhering to the rotating disks can no longer be depended upon to keep the recording heads and the disks apart. Thus, the arrangement of my invention safeguards effectively both the recording heads including the transducers and the recording disks from damage by contact with each other.

While I have explained my invention with the aid of a preferred embodiment thereof, it will be understood that the invention is not limited to the specific constructional details illustrated and described, which may be departed from without departing from the scope and spirit of my invention.

I claim:

1. In a recording machine having a recording disk, a recording head, and means for mounting the recording head for movement from an idle to a performance position closely adjacent to its coacting recording surface but spaced therefrom by a layer of air adhering to said recording surface during rotation of said disk, a safety arrangement for preventing direct contact of the recording head with the recording disk when the rotational speed of the disk is below a predetermined safety limit, said arrangement comprising an actuating bar mounted for movement from an initial position wherein said recording head is withdrawn from the recording disk to an effective position wherein it urges the recording head toward the coacting surface of the recording disk, and a normally disabled crank mechanism for setting said bar to its effective position including first and second levers mounted for independent rotation upon a common pivot, and means effective when the rotational speed of the disk reaches said predetermined limit for tying said levers together for rotation in unison upon their common pivot.

2. In a recording machine having a recording disk, a recording head, and means for mounting the recording head for movement from an idle to a performance position closely adjacent to its coacting recording surface but spaced therefrom by a layer of air adhering to said recording surface during rotation of said disk, a safety arrangement for preventing direct contact of the recording head with the recording disk when the rotational speed of the disk is below a predetermined safety limit, said arrangement comprising an actuating bar mounted for movement from an initial position wherein said recording head is withdrawn from the recording disk to an effective position wherein it urges the recording head toward the coacting surface of the recording disk, and a normally disabled crank mechanism for setting said bar to its effective position including first and second levers mounted for independent rotation upon a common pivot, said first lever having an arm pivotally secured to said bar and said second lever having an arm formed into an actuating handle, and means including a solenoid and a centrifugal control switch for said solenoid effective when the rotational speed of the disk reaches said predetermined limit to tie said levers together for rotation in unison upon their common pivot.

3. In a recording machine having a recording disk, a recording head, and means for mounting the recording head for movement from an idle position to a performance position closely adjacent to its coacting recording surface but spaced therefrom by a layer of air adhering to said recording surface during rotation of said disk; a safety arrangement for preventing direct contact of the recording head with the recording disk when the rotational speed of the disk drops below a predetermined safety limit, said arrangement comprising an actuating bar mounted for movement from an initial position wherein the recording head is withdrawn from the recording disk into an effective position wherein it urges the recording head toward the coacting surface of the recording disk; a normally disabled crank mechanism for setting said bar to its effective position including first and second two-armed levers mounted for independent rotation upon a common pivot, said first lever having an arm pivotally secured to said bar and said second lever having an arm formed into an actuating handle, means including a solenoid and a centrifugal control switch for said solenoid, effective to tie the other arms of said levers together for rotation in unison upon their common pivot when the rotational speed of said disk reaches said predetermined limit, and latching means effective to latch said actuating handle in a position wherein said levers hold said actuating bar in its effective position as long as they are tied together for rotation in unison.

4. In a recording machine having a recording disk, a recording head, and means for mounting the recording head for movement from an idle position to a performance position closely adjacent to its coacting recording surface but spaced therefrom by a layer of air adhering to said recording surface during rotation of said disk; a safety arrangement for preventing direct contact of the recording head with the recording disk when the rotational speed of the disk drops below a predetermined safety limit, said arrangement comprising an actuating bar mounted for movement from an initial position wherein the recording head is withdrawn from the recording disk into an effective position wherein it urges the recording head towards the coacting surface of the recording disk; a normally disabled crank mechanism for setting said bar into its effective position, including first and second two-armed levers mounted for independent rotation upon a common pivot, said first lever having an arm pivotally secured to said bar and said second lever having an arm formed into an actuating handle, means including a solenoid mounted upon one of said levers and a centrifugal control switch for said solenoid effective to tie the other arms of said levers together constraining said levers to rotation in unison upon their common pivot when the rotational speed of said disk reaches said predetermined limit; latching means effective upon manipulation of the actuating handle on said second lever when said first and second levers are tied together for rotation in unison, to latch said actuating handle in a position wherein said first lever holds said actuating bar in its effective position; spring means effective to return said actuating bar to its initial position when a decrease in the rotational speed of said disk below said predetermined limit causes said solenoid to release said levers for independent rotation and thus renders said first lever unable to hold said actuating bar in its effective position.

5. In a recording machine having a recording disk, a recording head, and means for mounting the recording head for movement from an idle position to a performance position closely adjacent to its coacting recording surface but spaced therefrom by a layer of air adhering to the recording surface during rotation of said disk; a safety arrangement for preventing direct contact of the recording head with the recording disk when the rotational speed of the disk drops below a predetermined safety limit, said arrangement comprising an actuating bar mounted for movement from an initial position wherein said recording head is withdrawn from the recording disk into an effective position wherein it urges the recording head towards the coacting surface of the recording disk; a normally disabled crank mechanism for moving said bar into its effective position, including first and second two-armed levers mounted for independent rotation upon a common pivot, said first lever having an arm pivotally secured to said bar and said second lever having an arm formed into an actuating handle, a solenoid mounted upon one of said levers and having an armature effective upon energization of said solenoid to tie the other arms of said levers together constraining said levers to rotation in unison upon their common pivot, and a centrifugal control switch for said solenoid arranged to effect energization thereof when the rotational speed of said disk reaches said predetermined limit; latching means effective upon manipulation of said actuating handle when said first and second levers are tied together for rotation in unison to latch the actuating handle in a position wherein said first lever holds said actuating bar in its effective position; spring means effective to restore said actuating bar to its initial position when a decrease in the rotational speed of said disk below said predetermined limit causes said centrifugal switch to open and said solenoid to release said levers for independent rotation, which renders said first lever unable to hold said bar in its effective position; and means upon said actuating bar effective during return movement thereof to its initial position to release said latching means.

6. In a recording machine having a recording disk, a recording head, and means for mounting the recording head for movement from an idle position to a performance position closely adjacent to its coacting recording surface but spaced therefrom by a layer of air adhering to said recording surface during rotation of said disk; a safety arrangement for preventing direct contact of the recording head with the recording disk when the rotational speed of the disk drops below a predetermined safety limit, said arrangement comprising an actuating bar mounted for movement from an initial position wherein the recording head is withdrawn from the recording disk into an effective position wherein it urges the recording head toward the coacting surface of the recording disk;

a normally disabled crank mechanism for setting said bar to its effective position including first and second two-armed levers mounted for independent rotation upon a common pivot, said first lever having an arm pivotally secured to said bar and said second lever having an arm formed into an actuating handle, means effective to tie the other arms of said levers together for rotation in unison upon their common pivot when the rotational speed of said disk reaches said predetermined limit, and latching means effective to latch said actuating handle in a position wherein said levers hold said actuating bar in its effective position as long as they are tied together for rotation in unison.

References Cited in the file of this patent

UNITED STATES PATENTS

| | | |
|---|---|---|
| 2,787,750 | Jones | Apr. 2, 1957 |
| 2,862,781 | Baumeister | Dec. 2, 1958 |
| 2,950,354 | Hohnecker | Aug. 23, 1960 |

FOREIGN PATENTS

| | | |
|---|---|---|
| 804,441 | Great Britain | Nov. 19, 1958 |